United States Patent [19]

Takahashi

[11] 4,419,025

[45] Dec. 6, 1983

[54] LOCKING DEVICE IN A TELESCOPIC TUBULAR TRIPOD LEG ELEMENT ASSEMBLY

[75] Inventor: Shoichiro Takahashi, Yokohama, Japan

[73] Assignee: Kenlock Corporation, Yokohama, Japan

[21] Appl. No.: 351,980

[22] Filed: Feb. 24, 1982

[30] Foreign Application Priority Data

Mar. 17, 1981 [JP] Japan .............................. 56-36308[U]

[51] Int. Cl.³ .............................................. B25G 3/00
[52] U.S. Cl. ...................................... 403/14; 403/109; 248/188.5
[58] Field of Search ..................... 403/109, 13, 14, 27; 248/188.5

[56] References Cited

U.S. PATENT DOCUMENTS 414,903 11/1889 Godillot ........................... 248/188.5

FOREIGN PATENT DOCUMENTS 976 of 1885 United Kingdom ............. 248/188.5

*Primary Examiner*—Andrew V. Kundrat
*Attorney, Agent, or Firm*—Kane, Dalsimer, Kane, Sullivan and Kurucz

[57] ABSTRACT

A locking device in a telescopic tripod leg element assembly for camera to fix an inner and an outer tubular leg elements in an extended position. A sleeve has at its one end an internal multiple thread and at the other end an inner peripheral face providing a guide face for the inner tubular leg element. The inner tubular leg element is provided at the inner end with an external multiple thread. The inner and outer tubular leg elements are locked in an extended position by engaging threadably the internal and external multiple threads with each other.

8 Claims, 2 Drawing Figures

LOCKING DEVICE IN A TELESCOPIC TUBULAR TRIPOD LEG ELEMENT ASSEMBLY

FIELD OF THE INVENTION

This invention relates to a locking device in a telescopic tripod leg element assembly for camera comprising at least inner and outer tubular leg elements of circular cross-section.

Such telescopic tripod leg element assembly for camera is provided with a locking device for fixing an inner and outer tubular leg elements with each other in an extended position thereof.

There is known a lever type of locking device which is intended particularly to lock the inner and outer tubular leg elements quickly in an extended position by swinging a lever attached to the outer tubular leg element. Another screw type of locking device is known which has a clamping ring provided on the outer tubular leg element, and locking operation is performed by turning the clamping ring in an extended position of each of the leg element assemblies. However the lever type of locking device was complicated in construction, expensive to manufacture, and unreliable over a period of time. The screw type of locking device required several turning of the clamping ring which was troublesome. Furthermore, in either of the locking devices, the locking means provided outside the outer tubular leg element was cumbersome and unattractive.

BRIEF SUMMARY OF THE INVENTION

It is an object of the invention to eliminate the above-mentioned disadvantages and provide a locking device in a telescopic tripod leg element assembly comprising at least inner and outer tubular leg elements of circular section, which is simple in construction and ensures rapid and positive locking of the tubular leg elements.

It is another object of the invention to provide a locking device in a telescopic tripod leg element assembly which enables the inner and outer tubular leg elements to be fixed only by slightly turning the inner tubular leg element with respect to the outer tubular leg element in an extended position without providing any clamping means outside the outer tubular leg element.

According to one aspect of the invention, there is provided a locking device in a telescopic tubular tripod leg element assembly comprising at least inner and outer tubular leg elements of circular cross-section, comprising a sleeve having at its one end an internal multiple thread and at the other end an inner peripheral face forming a guide face for said inner tubular leg element, said sleeve being fixedly secured to the inner peripheral face of said outer tubular leg element, and an external multiple thread provided at the inner end of said inner tubular leg element and adapted to be engaged by said internal multiple thread of said sleeve.

BRIEF DESCRIPTION OF DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
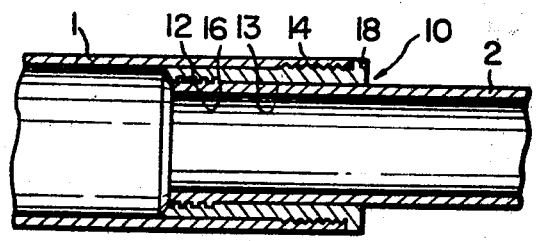
FIG. 1 is a fragmentary longitudinal sectional view illustrating an embodiment of a locking device in a telescopic tripod leg element assembly according to the present invention.

Referring to the attached drawings, in FIG. 1, there is shown a first embodiment of a locking device in a telescopic tripod leg element assembly for camera according to the present invention. Numerals 1 and 2 designate an outer and inner tubular leg elements respectively which constitute a tripod leg element assembly.

According to the invention, a sleeve 10 is fixedly secured to the inner peripheral face at the outer end of the outer tubular leg element 1 by means of thread 14 or adhesion. The sleeve 10 is provided at its one end with an internal multiple thread 12 and at the other remaining portion with a guide face 13 for the outer peripheral face of the inner tubular leg element 2. On the other hand, the inner tubular leg element 2 is provided at the inner end with an external multiple thread 16 which engages threadably with the internal multiple thread 12 of the sleeve 10.

The external multiple thread 16 may be provided on an enlarged diameter portion formed by expanding radially the inner end portion of the inner tubular leg element 2 by suitable means the amount corresponding to the height of thread.

In order to screw and fix the sleeve 10 in the outer tubular leg element 1, the sleeve 10 may be formed with a flange 18 at the end adjacent to the thread 14, and the flange 18 is provided with a plurality of axial grooves on the outer peripheral surface.

For the multiple thread in the device of the present invention, a conventional triangular thread may be used, but from the view point of strength and durability, it is preferable to use a trapezoidal thread called "Helicoid thread" which is higher in precision and larger in pitch.

Furthermore, the multiple thread according to the invention includes double or more thread, and preferably may be selected from a range of quadruplicate to octuple thread, and the axial effective length of the multiple thread portion is less than the lead of thread, preferably within a range of $\frac{1}{4}$ to $\frac{1}{2}$ the lead. With such axial effective length, the locking of each tripod leg element assembly in an extended position can be completed only by turning the inner tubular leg element 2 through an angle of approximately 90°–180° with respect to the outer tubular leg element 1. The multiple thread may be either right-hand or left-hand thread, preferably the former.

The sleeve 10 is preferably made of plastic material having higher strength, thereby providing the increased friction between the internal multiple thread of the inner tubular leg element 2 of light alloy and the external multiple thread of the sleeve 10 to prevent them from loosening. In addition, it is preferable to chamfer the end face of the sleeve 10 adjacent to the multiple thread.

Figure 2:
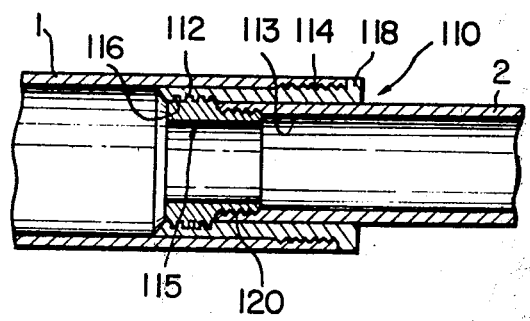
FIG. 2 is a fragmentary longitudinal sectional view of another embodiment of a locking device according to the present invention.

FIG. 2 is illustrates a second embodiment of a locking device according to the invention, and in FIG. 2, like numerals designate like or corresponding parts. In stead of providing the enlarged diameter portion on the inner tubular leg element 2, this device comprises a bush 115 having an external multiple thread 116, and said bush 115 is screwed and fixed in place into the inner end of the inner tubular leg element 2 by means of triangular thread 120 or adhesion.

In screwing the external multiple thread 16 belonging to the inner tubular leg element 2 into the internal multiple thread 12 of the sleeve 10 fixed in the outer tubular leg element 1 in an extended position of the tripod leg element assembly, it is not easy to initially engage threadably with each other. Accordingly, a mark indicating an aligned position in which the internal and external threads start to mate with each other is applied on both the peripheral face of the inner tubular leg element 2 and the end face of the sleeve 10 or 110.

In locking the inner and outer tubular leg elements so constructed, first the inner tubular leg element 2 accommodated in the outer tubular leg element 1 is drawn out, then the mark on the inner tubular leg element 2 is aligned with that of the collar 10 or 110, and the inner tubular leg element 2, while being pulled, is turned with respect to the outer tubular leg element 1.

The locking device of a telescopic tubular tripod leg element assembly according to the invention has less components, is extremely simple in construction and ensures rapid and positive locking of the inner and outer tubular leg elements with simple operation consisting of only slight rotation of the inner tubular leg element relative to the outer tubular leg element.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A locking device in a telescopic tubular tripod leg element assembly comprising at least inner and outer tubular leg elements of circular cross-section, said locking device comprising a sleeve having at its one end an internal multiple thread and at the other end an inner peripheral face forming a guide face for said inner tubular leg element, said sleeve being fixedly secured to the inner peripheral face of said outer tubular leg element, said inner tubular leg element having an inner end portion with an enlarged diameter and an external multiple thread provided at the enlarged diameter of the inner end of said inner tubular leg element and adapted to be engaged by said internal multiple thread of said sleeve.

2. A locking device as set forth in claim 1, wherein said sleeve is fixedly secured to the inner face at the other end of the outer tubular leg element said enlarged diameter comprises a bush having at its one end an external multiple thread, said bush being fixedly secured to the inner end portion of said inner tubular leg element.

3. A locking device as set forth in claim 1, wherein the axial effective length of said multiple thread portion is less than the lead of thread.

4. A locking device as set forth in claim 3, wherein the axial effective length of said multiple thread portion lies within a range of $\frac{1}{2}$ to $\frac{1}{4}$ the lead of thread.

5. A locking device as set forth in any of claims 1, 3 and 4, wherein said multiple thread is trapezoidal thread called "Helicoid thread".

6. A locking device as set forth in claim 1, wherein said multiple thread includes double or more thread, and preferably may be selected from a range of quadruplicate to octuple thread.

7. A locking device as set forth in claim 1, wherein said sleeve is made of high strength plastic material.

8. A locking device as set forth in claim 1, wherein a mark is applied on both the outer end portion of said inner tubular leg element and the end face of the sleeve to indicate an aligned position in which the inner multiple thread of said sleeve and the external multiple thread belonging to said inner tubular leg element start to mate with each other.

* * * * *